FIG. 5.

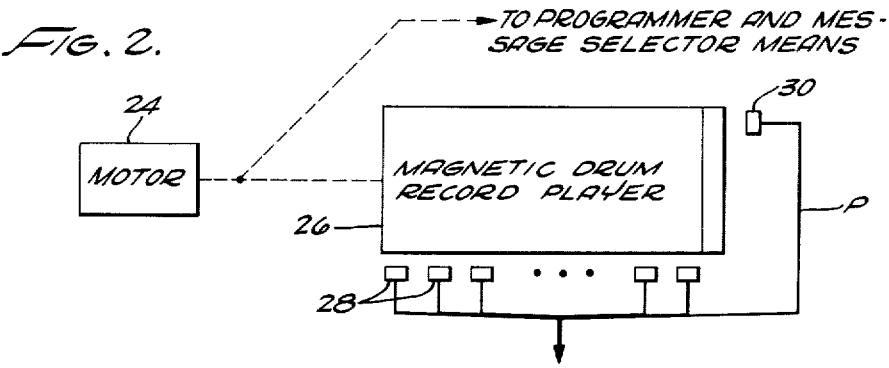
FIG. 2.
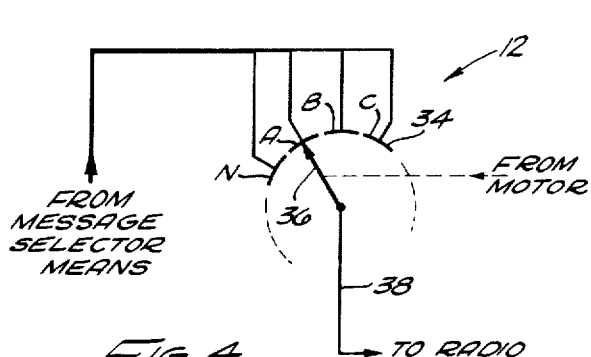
FIG. 3.
FIG. 4.
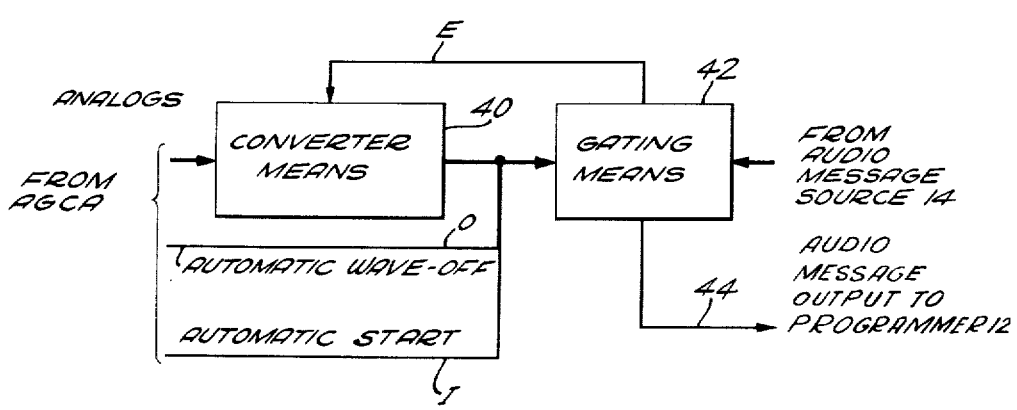
FIG. 6.
INVENTOR.
BURTON CUTLER
BY
ATTORNEY

| TRACK NO. | | |
|---|---|---|
| 1 : | Right of course | 10 feet |
| 2 : | Right of course | 20 feet |
| ⋮ | | |
| 299 : | Right of course | 2990 feet |
| 300 : | Left of course | 10 feet |
| 301 : | Left of course | 20 feet |
| ⋮ | | |
| 598 : | Left of course | 2990 feet |
| 599 : | On course | |
| 600 : | On glidepath | |
| 601 : | Above glidepath | 10 feet |
| ⋮ | | |
| 900 : | Below glidepath | 10 feet |
| ⋮ | | |
| 1199 : | Steer heading | 000 degrees |
| ⋮ | | |
| 1558 : | Steer heading | 359 degrees |
| 1559 : | Range | 9 miles |
| ⋮ | | |
| 1567 : | Range | 1 mile |
| 1568 : | Range | 3/4 mile |
| 1569 : | Range | 1/2 mile |
| 1570 : | Range | 1/4 mile |
| 1571 : | This is automatic voice GCA  You are now under control  You do not acknowledge further transmission | |
| 1572 : | Approaching glidepath prepare to descend | |
| 1573 : | On glidepath start descent | |
| 1574 : | Pull up discontinue this approach | |
| 1575 : | Touchdown in 15 seconds take over visually | |

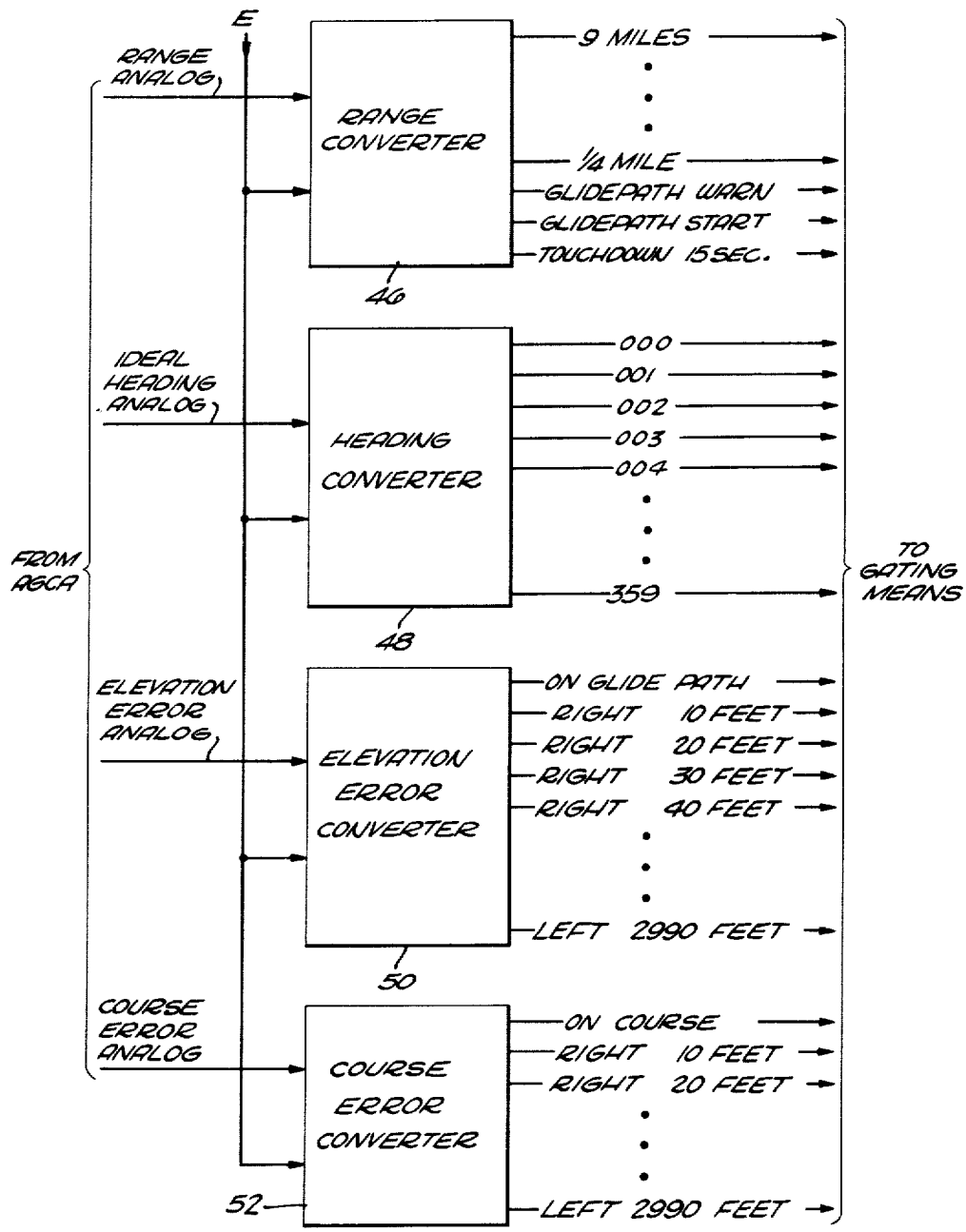

INVENTOR.
BURTON CUTLER

July 2, 1963      B. CUTLER      3,096,513

SEMI-AUTOMATIC GROUND CONTROLLED APPROACH SYSTEM

Filed Oct. 14, 1957      6 Sheets-Sheet 6

INVENTOR.
BURTON CUTLER
BY
ATTORNEY

United States Patent Office 3,096,513
Patented July 2, 1963

3,096,513
SEMI-AUTOMATIC GROUND CONTROLLED
APPROACH SYSTEM
Burton Cutler, Los Angeles, Calif., assignor to Gilfillan
Bros., Inc., Los Angeles, Calif., a corporation of California
Filed Oct. 14, 1957, Ser. No. 689,999
13 Claims. (Cl. 343—7)

This invention relates to ground controlled approach (GCA) systems and, more particularly, to a partially mechanized arrangement for directing the approach of a piloted aircraft for landing.

At the present time, three systems are used to guide an aircraft for landing. Two of these systems are called automatic ground controlled approach (AGCA) systems. Both of these utilize a ground based radar system from which the speed, position and attitude of an air craft are determined. In both of these systems ground based computers are employed to produce error control signals by which the approach of an aircraft may be corrected to an ideal one. However, in one of the AGCA systems, the error control signals are metered in the aircraft and the piot corrects for the position errors. In the other of the AGCA systems, automatic equipment in the aircraft is employed to correct for errors in the approach of the aircraft automatically.

The other system used to guide the approach of an aircraft for landing is the well known GCA system. This is most widely used because the capital expenditure for equipment to utilize it is substantially less than that required for equipment used in AGCA systems.

An AGCA system is described and claimed in copending application Serial No. 398,288 filed December 15, 1953, now U.S. Patent No. 2,980,902 by H. G. Tasker et al. and entitled, Automatic Ground Controlled Approach Systems.

A GCA system is described in U.S. Patent No. 2,555,101.

Although conventional GCA and AGCA systems are very useful and have achieved considerable commercial success, both types of these systems leave something to be desired under certain air traffic conditions. AGCA systems alone are generally inadequate at landing fields where much of the air traffic is not equipped for AGCA control. Thus a ground operator for "talk-down" must be constantly employed. AGCA systems also require airborne equipment which undesirably add weight to the aircraft in which they are stored and take away much useable space in the aircraft. AGCA systems also are relatively large and complicated and require large capital expenditures for equipment.

GCA systems also have several disadvantages. One of these relates to the requirement that an operator of a high level of competency must be employed in these systems because computation, interpolation and knowledge of a wide variety of aircraft is required. This for the reason that, among others, ground base radar displays must be interpreted by the operator. Not only is expensive and time consuming training required for the operator, but "talk-down" is very slow because the operator must take time to calculate and think. Still further, the operator is inherently inaccurate because he is pressed to give instructions at a reasonably rapid rate. Hence, he can only give scant quantitative guidance instructions which are relatively inaccurate.

It is therefore an object of the invention to provide an inexpensive, but semi-automatic GCA system.

Another object of the invention is to provide a semi-automatic GCA system requiring no more airborne equipment than a radio receiver.

A further object of the invention is to provide a relatively fast and accurate semi-automatic GCA system equipped to "talk-down" any aircraft having a radio receiver.

The invention achieves these and other objects and overcomes the above-described and other disadvantages of the prior art by providing a semi-automatic GCA system for use with a ground controlled approach system including a ground based radar system for producing output signals by which a piloted aircraft may be guided for landing. The system of the invention thus includes recording means containing a plurality of audio messages; means for reproducing the audio messages; and message selector means for gating out a single message at a time appropriate to guide the pilot of the aircraft to an ideal landing position. Thus, only a radio receiver in an aircraft is required for the automatic "talk-down" feature of the invention, which equipment all airplanes are required to have anyway. The invention therefore may be used to guide the approach of all types of airplanes. Still further, no additional space is necessary in the airplane for special automatic "talk-down" equipment. This also eliminates weight in the airplane.

Still further, the equipment of the invention is rather inexpensive compared to that required in AGCA systems. Still further, expensive operator training can be reduced from that required with conventional GCA systems by 80 to 90 percent. Still further, a high level of competency is not required from the operator because he does not perform any computations or give any instructions, his sole duties being reduced to that of monitoring a ground display and monitoring the semi-automatic GCA system of the invention to insure that it continues to operate satisfactorily. Because everything is mechanized up to the point of giving oral instructions to the pilot automatically from voice recordings, by reproducing these recordings according to guidance necessary to appropriately correct the position or attitude of an aircraft, the system speeds "talk-down" considerably. Further, the time required for an operator's computation is entirely eliminated since automatic switching can result in a logical correction of a recording message instantaneously and the speed by which instructions are transmitted may be increased considerably. Still further, the instructions can also be made as accurate as desired. For this reason, further, it is an advantage of the invention that the human operator need not have any knowledge of any wide variety of aircraft as is usually required in conventional GCA systems.

It is also an advantage of the invention that information is supplied to the human operator, viz. a pilot of an aircraft immediately. In conventional GCA equipment, only a position indication is made on a GCA ground radar display. For this reason, the ground operator is slow in computing and often makes errors. If computers were supplied, it is true that an error indication could be made, however, the invention comprehends only the use of additional switching and voice recording equipment in addition to the computing equipment. Hence, with a very little increase in equipment, a GCA system may be made semi-automatic in accordance with the present invention.

A further advantage of the invention resides in the fact that messages or instructions for aircraft guidance may be easily standardized. Hence, as a pilot becomes more familiar with recorded messages transmitted, it will be easier for him to react to these messages when landing at any air field.

These and other objects and advantages of the present invention will be better understood when considered with the following description taken in connection with the accompanying drawings made a part of this specification, wherein an embodiment is illustrated by way of example. The device of the present invention is by no means limited to the specific embodiment illustrated in the drawing since it is shown merely for purposes of description.

FIG. 2 is a schematic diagram of an audio message source which may be employed in connection with the embodiment shown in FIG. 1;

FIG. 3 is an end elevational view of a magnetic drum employed in synchronization in accordance with the invention;

FIG. 4 is a schematic diagram of a programmer shown in FIG. 1;

FIG. 5 is a diagrammatic view of a magnetic record employed with the record player shown in FIG. 2;

FIG. 6 is a schematic diagram of a message selector shown in FIG. 1;

FIG. 7 is a block diagram of converter means shown in FIG.6;

Figure 1:
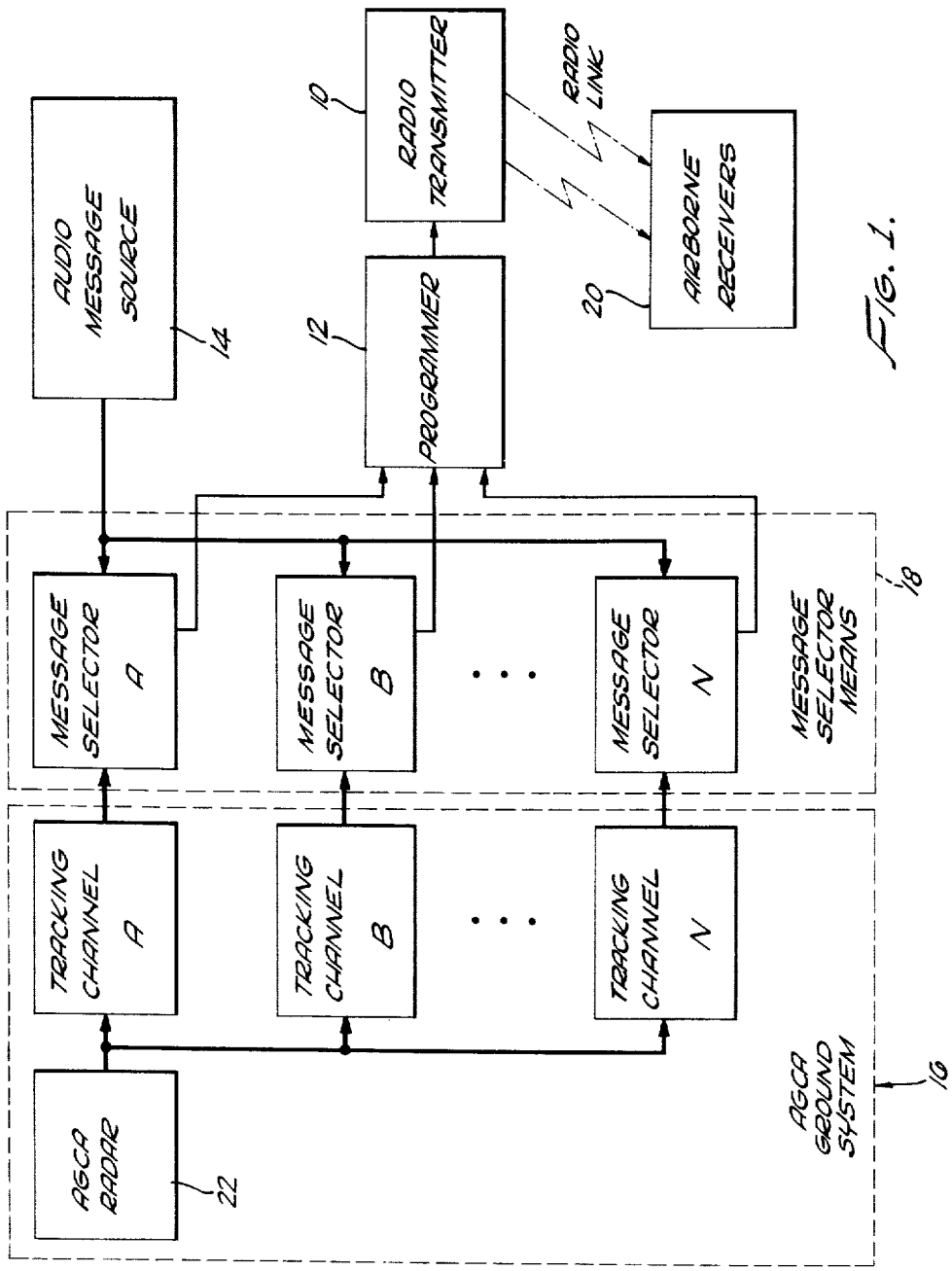
FIG. 1 is a block diagram of one embodiment of the invention.

In the drawing in FIG. 1 an embodiment of the invention is shown wherein a ground based radio transmitter 10 is timed shared. This, of course, need not be the case and one transmitter may be provided for each airplane to be guided. However, since the radio transmitter 10 is timed shared, a programmer 12 is provided in order to select an audio message appropriate to one particular aircraft at a time.

All audio messages are recorded in an audio message source 14 which preferably is a magnetic drum recorder. A conventional AGCA ground system 16 is provided which may be identical with the ground system shown in the AGCA system of the previously mentioned Tasker application. Message selector means 18 are then provided in accordance with the invention to select particular messages from audio message source 14 and introduce them to programmer 12. One of these messages is then passed to radio transmitter 10 which then transmits the audio message via a radio link to airborne receivers indicated generally as a block 20. AGCA ground system 16 includes simply an AGCA radar 22 having output to several tracking channels A, B, . . . N. The tracking channels produce continuous output analog voltages proportional to the position and attitudes of corresponding aircraft. Message selector means 18 is then provided with a corresponding number of message selectors A, B, . . . N to select a message from audio message source 14 corresponding to regular input signals from the tracking channels A, B, . . . N.

It is to be noted that according to a special feature of the invention, a single audio message source 14 may be provided for any number of tracking channels.

Audio message source may include a motor indicated at 24 in FIG. 2 which is employed to drive a magnetic drum record player 26 having reproduced heads 28 corresponding to every possible individual message required to be transmitted to guided aircraft for landing. On the end of the drum 26, a reproduce head 30 is provided under which a magnetic slug 32 passes as indicated at an end view in FIG. 3 to produce a pulse indicated at P at the output from reproduce head 30 in FIG. 2 for synchronization of the system.

FIG. 4 is a diagrammatic view of programmer 12 shown in FIG. 1. As stated previously, this is not at all necessary when a different radio transmitter is utilized for each tracking channel A, B, . . . N.

As shown, in FIG. 4 programmer 12 comprises simply a commutator type structure including conductive elements 34 corresponding to each of the tracking channels A, B, . . . N. A wiper 36 is moved around in contact with the conductive elements 34 in synchronism with drum 26 by a connection to motor 24. The output of programmer 12 at 38 connected to wiper 36 is passed to radio transmitter 10. Although programmer 12 is simply a time sharing apparatus, logical switching may be substituted therefor for selecting messages for transmission which are priority messages when an aircraft is causing a hazard or when other traffic conditions necessitate contacting the pilot of one airplane rather than that of another.

FIG. 5 is self-explanatory. The messages on different tracks of a drum record are shown. These are merely representative of preferred messages. In the track positions on the record of drum 26, the messages are printed in detail. Preferably the range messages decrease 9 to 1 in mile steps and then from 1 to ¼ in quarter-mile steps. When it is desirable to warn a pilot that he is approaching glidepath intersection, a special message is desired. Likewise, when he is instructed to start his glidepath descent, it is desirable to send him another special message. At the end of his run, it is desirable to tell him that he is over the runway. For this reason, another special message is provided. Headings are given in degrees from 000 to 359 degrees on separate tracks. Elevation error both above glidepath and below it is given in 10 foot intervals from 000 to 2990. Special tracks are also provided for right of glidepath error and left of glidepath error. "On glidepath" means that there is zero error. The same is true for an "on course" message. There are also a group of special messages to indicate that automatic control has been taken over. Lastly, a wave-off message is provided if it is desired that a pilot discontinue his approach.

FIGS. 6, 7, 8a, 8b, 9a and 9b are detailed schematic diagrams of other blocks shown in the drawings. All these arrangements may be employed in connection with the embodiment of the invention shown in FIG. 1 or with an embodiment wherein a radio transmitter is provided for each of the messages selectors A, B, . . . N.

In FIG. 6, a message selector is shown including converter means 40 and gating means 42. Information is in the form switching signals provided to gating means 42 by converter means 40 and by the AGCA ground system 16 shown in FIG. 1.

Converter means 40 accepts analog input signals from AGCA ground system 16 and converts them into bilevel switching signals. For example, if the range of an aircraft is 9 miles a single switching signal, for example, a high voltage rather than a zero voltage is produced at the output of converter means 40 corresponding to the condition range=9 miles. AGCA ground system 16 also produces an automatic wave-off signal indicated at 0 in FIG. 6 and an automatic start signal indicated at I in FIG. 6. In the schematic representation, it is to be understood that wherein logical switching, i.e., switching according to certain conditions, is employed, a high voltage may represent that the condition is "true" and a low voltage that the condition is "false." Similarly, both high and low voltages may be employed on two separate leads to indicate the same condition. A condition may be represented "true" when a high voltage is received on one lead and the condition represented "false" when a high voltage is received on the other lead. This may be done by the use of flip-flops employed in the digital computing art. Similarly, the signal 0 represents that an automatic wave-off signal has been generated by AGCA ground system 16 when, for example, a high voltage is impressed on one lead whereas a signal 0' indicates that a high voltage on another lead indicates that an automatic wave-off signal has not been generated.

Gating means 42 shown in FIG. 6 includes logical switching for gating out audio messages recorded on drum 26 in response to the conditions set by the output switching signals of converter means 40. Gating means therefor receives audio message inputs from magnetic drum 26. A single message output is then provided on a lead 44 from gating means 42.

In the preferred system of the invention, converter means 40 includes four converters, each corresponding to a particular anlalog input signal from AGCA ground system 16. Hence, a range converter 46 is provided for a range analog input signal, a heading converter 48 for an ideal heading analog input signal, an elevation error converter 50 for an elevation error analog input signal, and a course error converter 52 for a course error input signal. The converters 46, 48, 50 and 52 produce output switching signals. All these signals are provided on different electrical leads. For example, the 9 mile output lead will receive a high voltage output when the range of an aircraft being tracked is 9 miles. No other lead will receive a high voltage signal. The same is true for output leads of the heading, elevation error, and course error converters 48, 50 and 52.

Range converter 46 preferably includes supplemental equipment in order to produce glidepath warn and glidepath start signals W and S. The glidepath warn signal W is the signal that selects the message in message source 14 which informs the pilot of an airplane that he is closely approaching intersection with the ideal glidepath on which he is to descend. The glidepath start signal S gates out the message that instructs the pilot to start his glidepath descent. Range converter 46 also produces a touchdown signal T which gates out the particular audio message that tells the pilot to take over visually, that he is out of AGCA range.

Figure 8A:
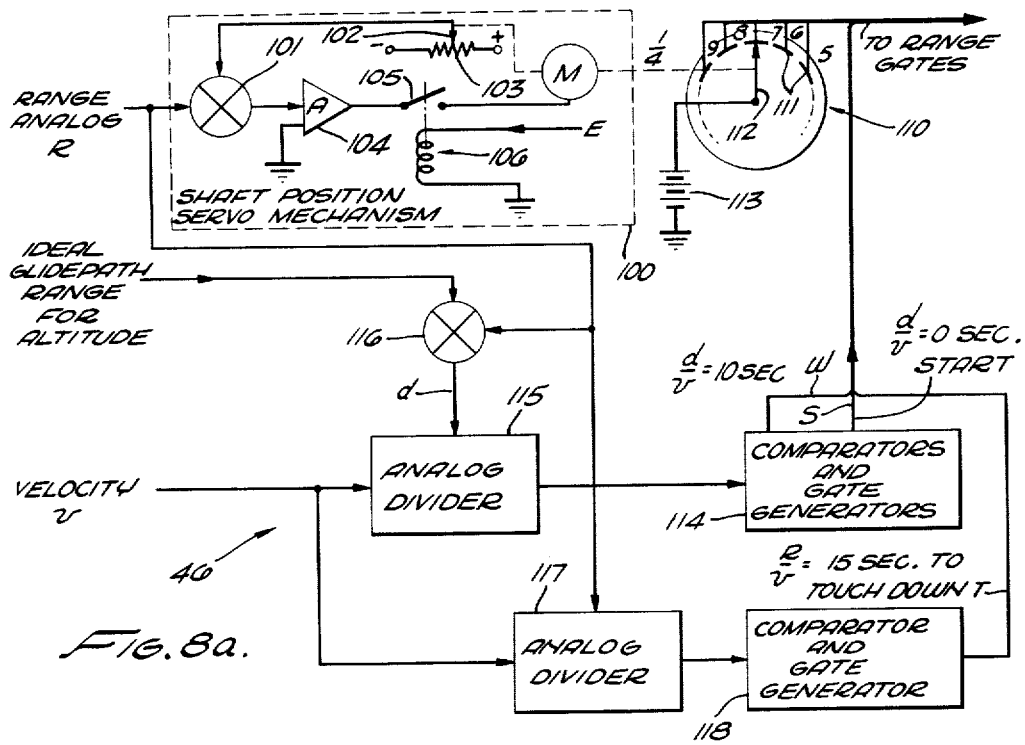
FIGS. 8a and 8b are schematic diagrams of converters shown in FIG. 7.

Range converter 46 is shown in detail in FIG. 8a including a shaft position servo mechanism 100 which operates a commutator type structure 110 including conductive elements 111 and a wiper arm 112 which is rotated to a position corresponding to the range of an aircraft being tracked. A high output voltage signal is provided by a potential source 113 electrically connected to wiper 112. These are provided on separated output leads corresponding to a particular range of the aircraft being tracked. Range converter 46 also includes some analog computing devices to produce output signals W, S and T. Output signals W and S are simply generated by comparators and gate generators indicated generally at 114 which produce output gates, for example, from monostable multivibrators. The monostable multivibrators or gate generators may be operated by Schmidt trigger circuits that actuate them when the input voltage thereto exceeds a predetermined value. When the range of an airplane from glidepath interesection divided by its velocity is equal to 10 seconds, the warn signal W will be generated. When this ratio is equal to zero seconds, the start signal S will be generated. The ratio of the difference between the actual range of the aircraft and its ideal glidepath range for its altitude is provided from an analog divider 115 having a velocity input from the AGCA ground system 16 and a range difference input from a subtractor 116 which subtracts the actual range R from the ideal glidepath range of an aircraft for its altitude. An analog divider 117 is also provided to divide R by $v$ to produce an output from a comparator in gate generator 118 substantially identical with the comparators in gate generator 114 to produce an output voltage pulse when the ratio $R/v$ is equal to 15 seconds. The outputs of comparators and gate generators 114 and 118 are then impressed with the output of commutator type structure 110 on a group of range audio gates indicated at 120 in FIG. 9a. An audio gate is provided for each output lead of range converter 46. An audio input to each gate is provided from a single reproduce head 28 adjacent magnetic drum 26 in a corresponding position to a track thereon.

Figure 8B:
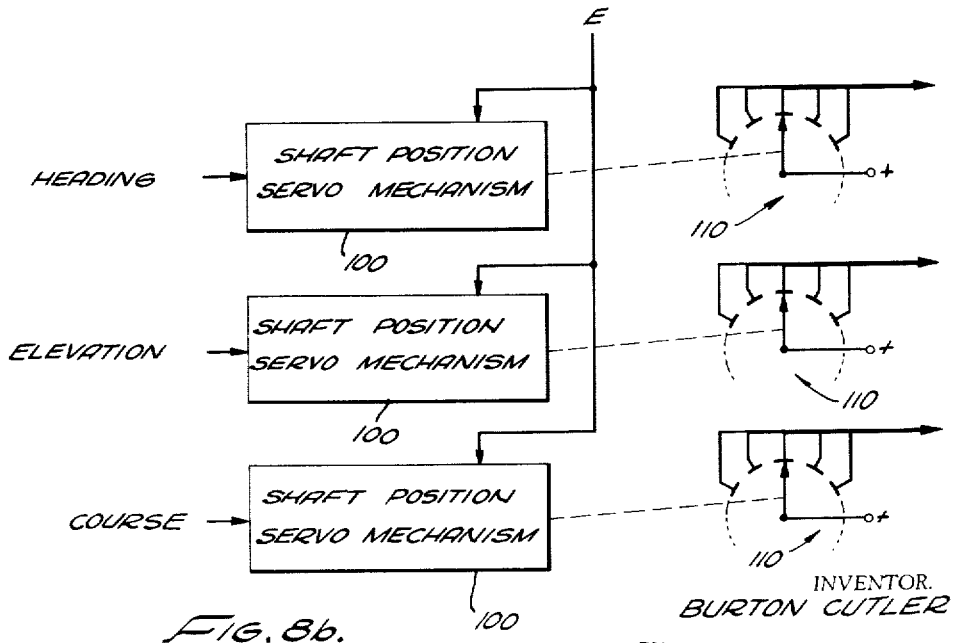

Heading, elevation and course converters 48, 50 and 52 may be identical with the shaft position servo-mechanism 100 shown in FIG. 8a and commutator type structure 110. This is shown in FIG. 8b. Shaft position servo-mechanism 100 shown in FIG. 8a is of a conventional type including a subtracting circuit 101 employed to subtract an input from a wiper 102 on a potentiometer 103 which is supplied at each end by positive and negative voltages, respectively, and an input of the range analog R from AGCA system 16. The difference is impressed upon an amplifier 104 through a switch 105 on a motor M. Switch 105 is closed on the energization of a relay 106 by application of a high voltage signal E. The signal E is employed to disable motor M when a message is being transmitted, it generally being undesirable to change from one conductive element 111 to another during the transmission of a single message. Production of signal E is provided by a monostable multivibrator indicated at 130 in FIG. 9b, the signal E being produced simply by application of the synchronizing pulse P produced by reproduce head 70 shown in FIG. 2.

Figure 9A:
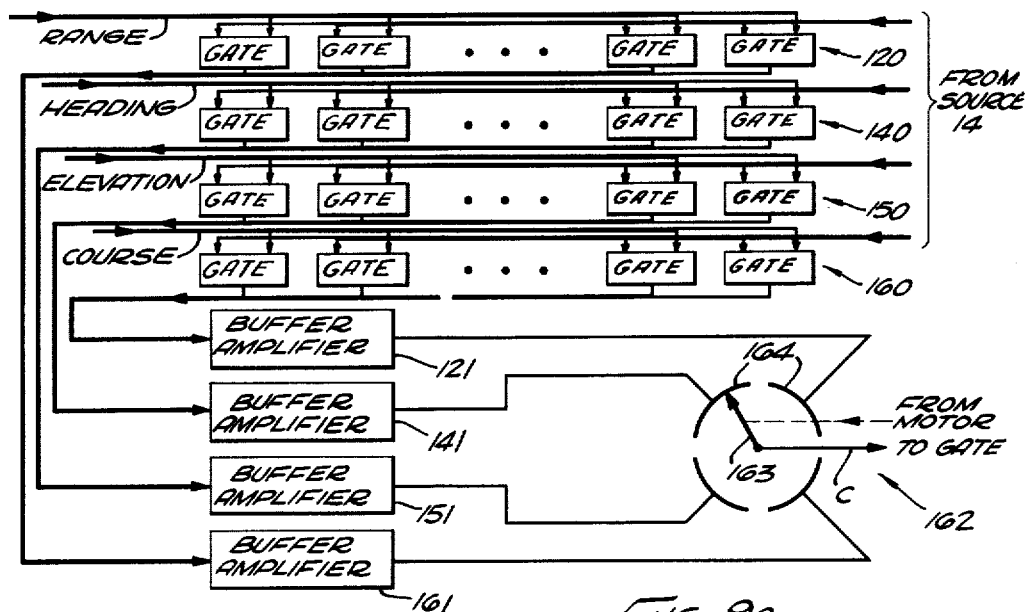
FIGS. 9a and 9b are schematic diagrams of gating means shown in FIG. 6.
Figure 9B:
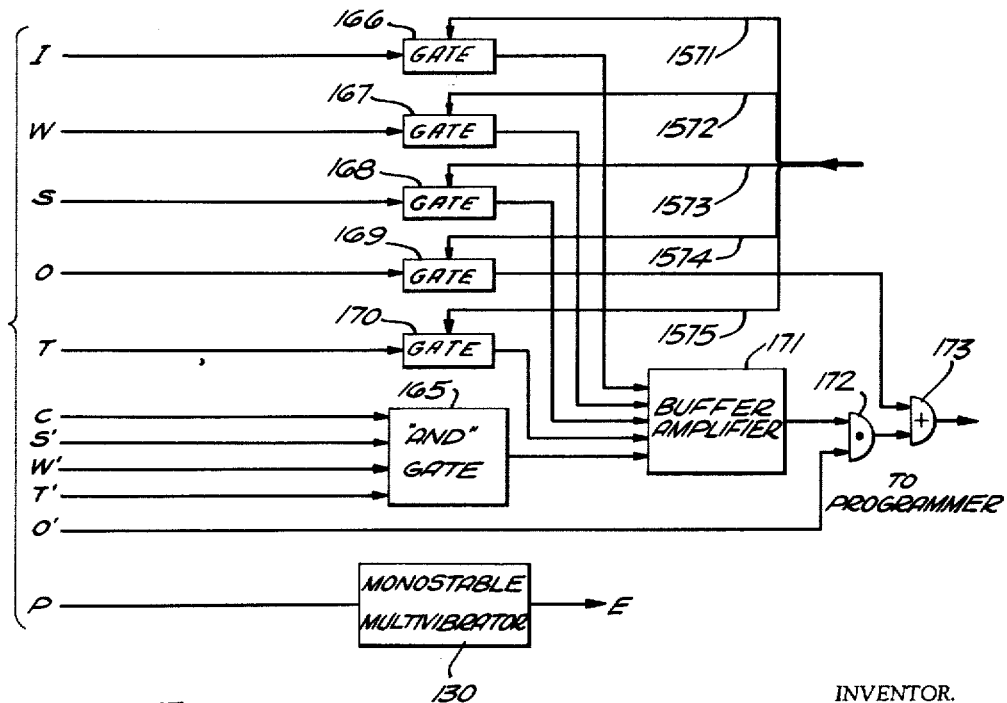

As there is a group of audio message gates 120 to pass a particular audio message depending upon which one of the conductive elements 111 shown in FIG. 8a is in contact with the wiper 112, likewise there is a plurality of audio gates 140, 150 and 160 for each group of heading, elevation and course outputs of converters 48, 50 and 52, respectively. The outputs of each set of gates 120, 140, 150 and 160 are impressed upon corresponding buffer amplifiers 121, 141, 151 and 161. The outputs of each of the buffer amplifiers 121, 141, 151 and 161 is then a single lead on which an audio message is transmitted that corresponds to a particular position of a corresponding wiper in each of the commutator type structures 110 of converters 46, 48, 50 and 52. Although logical switching may be employed to select any one of these messages in preference to the other, simply a time sharing arrangement is provided comprising still another commutator type structure 162 including a rotatable wiper 163 to contact four conductive segments 164 to which buffer amplifiers 121, 141, 151 and 161 are connected respectively. If time sharing of radio transmitter 10 is desired, commutator type structure 162 is preferably moved only over one of the conductive segments 164 while wiper 36 shown in FIG. 4 makes one complete revolution. Only a single command signal C appears at the output of commutator type structure 162 electrically connected to wiper 163. The manner in which this is gated out by logical switching is illustrated in FIG. 9b. It is first impressed upon a logical "and" gate 165 which passes that audio message only when the signals S', W' and T' are "true." This means there must not be warn, start or touchdown switching signals, otherwise the command signal C will not be passed by "and" gate 165. Since each set of audio gates 120, 140, 150 and 160 operates exactly analogously, only the operation of set 120 will be explained.

Should the input to range converter 46 be proportional to a quarter mile range, the output lead of range converter 46 labeled one-quarter mile in FIG. 7 will be supplied with an actuating voltage which will be impressed upon only one of the gates 120 which will also have an input from a corresponding reproduce head 28 adapted to produce an audio message output and located to detect the magnetically recorded audio message on track No. 1570 shown in FIG. 5. Thus, one of the audio gates of set 120 is provided for each of the output leads of range converter 46 and each of the output leads of range converter 46 is connected to a corresponding and only one of the gates of set 120. A number of tracks and, therefore, a number of reproduce heads 28, will also be provided on the record of the magnetic drum shown in FIG. 2 for each one of the output leads of converter means 46. Each of these reproduce heads 28 thus will be connected to a corresponding and only one of the gates of set 120. The output leads of range converter 46 thus will also correspond exactly to the output leads of reproduce heads 28 adapted to read messages recorded specifically on tracks 1559 through 1570 shown in FIG. 5. In other words, one of the gates 120 will be connected from the nine miles output lead of range converter 46 and to the reproduce head 28 adapted to read the record track No. 1559. Similarly, the one-quarter mile output lead of range converter 46 will be connected to the same audio gate of the set 120 to which the output lead of the reproduce head 28 is connected adapted to read track No. 1570, etc.

For special audio messages, five special audio gates 166, 167, 168, 169 and 170 are provided respectively for special input switching signals I, W, S, O and T to gate out special messages corresponding to these signals. Audio message inputs to gates 166, 167, 168, 169 and 170 are provided on output leads of reproduce heads 28 corresponding to tracks 1571, 1572, 1573, 1574, and 1575, respectively, as shown in FIG. 5. All of the message outputs of special message audio gates 166, 167, 168 and 170 are passed by buffer amplifier 171 which also passes the output of "and" gate 167. Any one of these messages are passed by buffer amplifier 171 to an "and" gate 172 which also passes the output of buffer amplifier 171 on the condition that there is no wave-off signal. This condition is represented by an input signal O'. A logical "or" gate 173 is provided to pass the output of "and" gate 172 or the output of audio gate 169.

It is to be noted that buffer amplifier 171 is not employed to pass the output of audio gate 169. This is the high priority wave-off message which must take priority over any other message when the corresponding switching signal O is generated. Thus it is always passed by "or" gate 173. Likewise, "and" gate 172 rejects all the messages if a wave-off signal is generated by AGCA ground system 16. It is to be noted that the signals I, W, S and T are all generated at different times. Hence, one of these corresponding messages need not be suppressed in favor of another since it will be necessary to transmit each of these messages at different times. However, it is necessary to suppress the quantitative messages regarding range, heading, elevation and course indicated as the input C to "and" gate 165 whenever the S, W, and T switching signals are generated.

Summarizing, the operation of the invention is as follows. AGCA ground system 16 in the preferred embodiment of the invention supplies range analog, ideal heading analog, elevation error analog and course error analog input voltages in addition to automatic wave-off switching signals O and O' and automatic start signal I. Converter means 40 shown in most detail in FIGS. 8a and 8b produces output switching signals on separate leads corresponding to conditions under which it is desirable to send a message to a pilot. All special logical switching functions I, W, S, O, T, C and P and the complements of S, W, T and O, which are designated S', W', T' and O', respectively are then impressed on the gating arrangement of FIG. 9b to gate out either a special message to audio gates 166, 167, 168, 169 and 170 or a regular range, heading, elevation or course message via a particular one of each corresponding set of the audio gates 120, 140, 150 and 160 and via commutator type structure 162.

As stated previously, the system of the invention will have considerable utility over conventional GCA and AGCA systems. The special system of the invention also has unusual advantages in itself in that any number of aircraft may be guided simply from one set of recorded messages on drum 26. That is, the outputs of reproduce heads 26 need not be time shared but may be used simultaneously. Still further, a plurality of airplanes may be guided simultaneously using one radio transmitter which is time shared. Also, there is unusual utility in the invention including gating means 42 which operates according to logical switching in combination with switching signals provided by converter means 40 to select a particular message that is to be reproduced from the magnetic drum 26. In accordance with the invention, motor 24 may be started each time that a message is required; however, it will generally be more practical to run motor 24 continuously and transmit a message for each revolution of drum 26.

Although only one specific embodiment of the invention has been shown and described, other changes and modifications will, of course, suggest themselves to those skilled in the art. Hence, the invention is not to be limited to the embodiment shown because it has been shown merely for purposes of illustration. Thus, the true scope of the invention is not limited to the embodiment shown or the apparatus described, but is defined only in the appended claims.

What is claimed is:

1. In a ground controlled approach system including a ground based radar system for producing output signals by which a piloted aircraft may be guided for landing, an arrangement for automatically transmitting audio messages to an aircraft to guide it, said arrangement comprising: record means containing recordings of a plurality of audio messages; means for reproducing said audio messages; a set of range audio gates for passing only range audio messages developed by said reproducing means; a set of heading audio gates for passing only heading audio messages developed by said reproducing means; a set of elevation audio gates for passing only elevation audio messages developed by said reproducing means; a set of course audio gates for passing only course audio messages developed by said reproducing means; range, heading, elevation, and course converters for producing switching signals corresponding to the actual range, ideal heading, elevation error, and course error of an aircraft to be guided; said set of range audio gates being responsive to range switching signals to pass only one range audio message; said set of heading audio gates being adapted to pass only one heading audio message; said set of elevation audio gates being adapted to pass only one elevation audio message; said set of course audio gates being adapted to pass only one course audio message; and means to gate out only one of said one range, said one heading, said one elevation, and said one course audio messages at a time.

2. The invention as defined in claim 1, wherein means are additionally provided operable synchronously with said record means to enable and disable said converters.

3. A ground controlled approach system for guiding an aircraft to an ideal landing position, said system comprising: means for producing signals representative of the actual range, ideal heading, course error from an ideal course, and altitude error from an ideal altitude of an aircraft to be guided; record means containing recordings of a plurality of range, ideal heading, course error, and elevation error audio messages and a wave-off message; means for reproducing said audio messages; a radio transmitter to broadcast said messages; a radio receiver in said aircraft for receiving said messages; means for passing only one of said range, heading, course error and elevation error messages to said radio transmitter at a time; and means to prevent transmission of any of said range, heading, course error and elevation error messages to said radio transmitter and for passing a wave-off message to said radio transmitter when a safe landing cannot be made.

4. In a ground controlled approach system including a ground based radar system for producing output signals by which a piloted aircraft may be guided for landing, an arrangement for automatically transmitting audio messages to an aircraft to guide it, said arrangement comprising: record means containing recordings of a plurality of audio messages; means for reproducing said audio message; a set of range audio gates for passing only range audio messages developed by said reproducing means; a set of heading audio gates for passing only heading audio messages developed by said reproducing means; a set of elevation audio gates for passing only elevation audio messages developed by said reproducing means; a set of course audio gates for passing only course audio messages developed by said reproducing means; range, heading, elevation and course converters for producing switching signals corresponding to the actual range, ideal heading, elevation error, and course error of an aircraft to be guided; said set of range audio gates being responsive to range switching signals to pass only one range audio message; said set of heading audio gates being adapted to pass only one heading audio message; said set of elevation audio gates being adapted to pass only one elevation audio message; said set of course audio gates being adapted to pass only one course audio message; means to gate out only one of said one range, said one heading, said one elevation, and said one course audio messages at a time; means to produce a special switching signal at a predetermined time prior to the time that a guided aircraft is expected to cross an ideal glidepath; means to produce a special switching signal when a guided aircraft actually crosses the said ideal glidepath; means to produce a special switching signal at a time immediately prior to the time that landing is to take place; said record means including recordings of special messages corresponding to said special switching signals; an audio gate for each of said special audio messages; and means to suppress said range, heading, elevation and course audio messages and to pass each of said special audio messages when each corresponding switching signal is produced, but to pass said ones of said range, heading, elevation and course audio messages one at a time when none of said special switching signals are produced.

5. The invention as defined in claim 4, wherein the following are additionally provided: means for generating a wave-off switching signal when it is desired that a guided aircraft discontinue its approach; said record means including a recording of a wave-off audio message; said means for reproducing said audio messages including means to reproduce said wave-off audio message; an audio gate for said wave-off audio message; and means to suppress all reproduced audio messages in favor of said wave-off audio message when said wave-off switching signal is generated.

6. A ground controlled approach system for guiding a piloted aircraft to an ideal landing position, said system comprising: record means containing recordings of a plurality of audio messages; means for reproducing said audio messages; a set of range audio gates for passing only range audio messages developed by said reproducing means; a set of elevation audio gates for passing only elevation audio messages developed by said reproducing means; a set of course audio gates for passing only course audio messages developed by said reproducing means; range, heading, elevation and course converters for producing switching signals corresponding to the actual range, ideal heading, elevation error, and course error of an aircraft to be guided; only one in each of said sets of audio gates being responsive to one switching signal to pass a corresponding audio message; means to gate out only one of said one range, said one heading, said one elevation, and said one course audio messages; means to produce a special switching signal at a predetermined time prior to the time that a guided aircraft is expected to cross an ideal glidepath; means to generate a special switching signal when a guided aircraft actually crosses the said ideal glidepath; and means to generate a special switching signal at a time immediately prior to the time that landing is to take place; said record means including a recording of special messages corresponding to each of said special switching signals; an audio gate for each of said special audio messages; means to pass all of said range, heading, elevation and course audio messages only when none of said special audio switching signals are generated, and then to pass said special messages to the exclusion of all others when said special switching signals are generated; a radio transmitter to broadcast audio messages passed by said gating means; and a radio receiver in said aircraft to receive said audio messages.

7. The invention as defined in claim 6, wherein the following are additionally provided: means for generating a wave-off switching signal when it is desired that a guided aircraft discontinue its approach; said recording means including a recording of a wave-off audio message; said means for reproducing said audio messages including means to reproduce said wave-off audio message; an audio gate for said wave-off audio message recording; and means to suppress all reproduced audio messages in favor of said wave-off message but only when said wave-off switching signal is generated.

8. In a ground controlled approach system including means for producing a first signal of a magnitude proportional to the actual position of an aircraft, means for producing a second signal of a magnitude proportional to the ideal position of the aircraft, and means responsive to said first and second signals for producing a difference signal of a magnitude proportional to the departure of said actual aircraft position from said ideal aircraft position, the combination comprising: record means including recordings of a plurality of audio messages each containing a different number corresponding to the magnitude of a discrete departure of an actual aircraft position from an ideal aircraft position; first means actuable to reproduce said messages; second means actuable to transmit said messages to an aircraft; and message selector means responsive to said difference signal for actuating said second means to transmit to said aircraft one of said messages having a number approximately proportional to the magnitude of said difference signal.

9. In a ground controlled approach system including means for producing a first signal of a magnitude proportional to the actual position of an aircraft, means for producing a second signal of a magnitude proportional to the ideal position of the aircraft, and means responsive to said first and second signals for producing a difference signal of a magnitude proportional to the departure of said actual aircraft position from said ideal aircraft position, the combination comprising: record means including recordings of a plurality of audio messages each containing a different number corresponding to the magnitude of a discrete departure of an actual aircraft position from an ideal aircraft position; a plurality of pick-ups corresponding to and for producing each of said recorded messages independently; means to transmit said reproduced messages to an aircraft; a plurality of gates corresponding to said pick-ups, respectively, actuable to pass corresponding reproduced messages to said transmitting means; and message selector means responsive to said difference signal for actuating one of said gates to pass one of said messages having a number approximately proportional to the magnitude of said difference signal.

10. In a ground controlled approach system for guiding a plurality of aircraft to a landing position, said system including means for producing a first signal of a magnitude proportional to the actual position of each aircraft, means for producing a second signal of a magnitude proportional to the ideal position of each aircraft and means responsive to said first and second signals for producing a difference signal of a magnitude proportional to the departure of the actual and ideal aircraft positions of each corresponding aircraft, the combination comprising: record means including recordings of a plurality of audio messages each containing a different number corresponding to the magnitude of a discrete departure of an actual aircraft position from an ideal aircraft position; first means actuable to reproduce said messages; second means actuable to transmit said messages to an aircraft; message selector means responsive to said difference signal for actuating said second means to transmit to said aircraft one of said messages having a number approximately proportional to the magnitude of said difference signal; and a programer to select the message for transmission to an aircraft corresponding to said one difference signal.

11. In a ground controlled approach system for guiding a plurality of aircraft to a landing position, said system including means for producing a first signal of a magnitude proportional to the actual position of each aircraft, means for producing a second signal of a magnitude proportional to the ideal position of each aircraft and means responsive to said first and second signals for producing a difference signal of a magnitude proportional to the departure of the actual and ideal aircraft positions of each corresponding aircraft, the combination comprising: record means including recordings of a plurality of audio messages each containing a different number corresponding to the magnitude of a discrete departure of an actual aircraft position from an ideal aircraft position; a plurality of pick-ups corresponding to and for producing each of said recorded messages independently; means to transmit said reproduced messages to an aircraft; a plurality of gates corresponding to said pick-ups, respectively, actuable to pass corresponding reproduced messages to said transmitting means; message selector means responsive to one difference signal for actuating one of said gates to pass one of said messages having a number approximately proportional to the magnitude of said one difference signal; and a programer to select a message for transmission to an aircraft corresponding to said one difference signal.

12. In a ground controlled approach system including a ground based radar system for producing output signals by which a piloted aircraft may be guided for landing, an arrangement for automatically transmitting audio messages to an aircraft to guide it, said arrangement comprising: a magnetic drum recorder having a plurality of tracks for a plurality of audio messages; means to rotate the drum of said recorder at a constant rate; means for reproducing said recorded audio messages; means for gating out a single message at a time appropriate to guide the pilot of the aircraft to an ideal landing position; range, heading, course error and elevation error converters for producing switching signals representative of the actual range, ideal heading, course error from an ideal course, and elevation error from an ideal elevation of an aircraft to be guided, said gating means being responsive to said switching signals for gating out a single message at a time; and means operable synchronously with the rotation of said magnetic drum to enable and disable said converters.

13. In a ground controlled approach system including a ground based radar system for producing output signals by which a plurality of piloted aircraft may be successively guided for landing, an arrangement for automatically transmitting audio messages to an aircraft to guide it, said arrangement comprising: a magnetic drum recorder including a plurality of recording tracks for a plurality of audio messages; means for reproducing said audio messages; means for rotating the drum of said recorder at a constant rate; selector means for each aircraft but operative in response to said same set of reproducing means to gate out a single message at a time appropriate to guide a corresponding piloted aircraft to an ideal landing position; range, heading, course error and elevation error converters for producing switching signals representative of the actual range, ideal heading, course error from an ideal course, and elevation error from an ideal elevation of an aircraft to be guided, said gating means being responsive to said switching signals for gating out a single message at a time; and means operable synchronously with the rotation of said magnetic drum to enable and disable said converters.

References Cited in the file of this patent

UNITED STATES PATENTS

| 2,009,701 | Miles | July 30, 1935 |
| 2,165,256 | Hansell | July 11, 1939 |
| 2,555,101 | Alvarez | May 29, 1951 |
| 2,774,966 | Granqvist | Dec. 18, 1956 |

OTHER REFERENCES

"Western Aviation," published August, 1957, page 32 relied on.

UNITED STATES PATENT OFFICE
CERTIFICATE OF CORRECTION

Patent No. 3,096,513

July 2, 1963

Burton Cutler

It is hereby certified that error appears in the above numbered patent requiring correction and that the said Letters Patent should read as corrected below.

Column 1, line 24, for "piot" read -- pilot --; column 3, lines 27 and 30, for "timed", each occurrence, read -- time --; line 60, for "reproduced" read -- reproduce --; column 4, line 42, after "form" insert -- of --; column 5, line 5, for "anlalog" read -- analog --; line 57, for "subtractor" read -- subtracter --.

Signed and sealed this 10th day of November 1964.

(SEAL)
Attest:

ERNEST W. SWIDER
Attesting Officer

EDWARD J. BRENNER
Commissioner of Patents